United States Patent
Levijoki et al.

(10) Patent No.: US 8,844,267 B2
(45) Date of Patent: Sep. 30, 2014

(54) METHOD AND SYSTEM FOR CONTROLLING A NITROGEN OXIDE (NOX) CONVERSION EFFICIENCY MONITOR

(75) Inventors: Stephen Paul Levijoki, Swartz Creek, MI (US); Rebecca J. Darr, Milford, MI (US); Steve L. Melby, Howell, MI (US)

(73) Assignee: GM Global Technology Operations LLC, Detroit, MI (US)

(*) Notice: Subject to any disclaimer, the term of this patent is extended or adjusted under 35 U.S.C. 154(b) by 866 days.

(21) Appl. No.: 13/049,964

(22) Filed: Mar. 17, 2011

(65) Prior Publication Data

US 2012/0233984 A1    Sep. 20, 2012

(51) Int. Cl.
| | |
|---|---|
| *F01N 3/00* | (2006.01) |
| *F01N 3/10* | (2006.01) |
| *F01N 3/02* | (2006.01) |
| *F01N 3/20* | (2006.01) |
| *F01N 3/035* | (2006.01) |
| *F01N 11/00* | (2006.01) |
| *F01N 13/02* | (2010.01) |

(52) U.S. Cl.
CPC .............. *F01N 11/00* (2013.01); *F01N 3/2066* (2013.01); *F01N 2900/1402* (2013.01); *Y02T 10/24* (2013.01); *F01N 2900/1621* (2013.01); *F01N 2560/14* (2013.01); *F01N 3/035* (2013.01); *F01N 2550/02* (2013.01); *Y02T 10/47* (2013.01); *F01N 2560/026* (2013.01); *F01N 13/02* (2013.01); *F01N 3/106* (2013.01)
USPC .................. 60/276; 60/274; 60/297; 60/301; 60/311

(58) Field of Classification Search
USPC ..................... 60/274, 276, 295, 297, 301, 311
See application file for complete search history.

(56) References Cited

U.S. PATENT DOCUMENTS

| | | | |
|---|---|---|---|
| 4,335,073 A | 6/1982 | Sherwood et al. | |
| 7,736,595 B2 * | 6/2010 | Gady et al. | 422/105 |
| 7,858,060 B2 * | 12/2010 | Gady et al. | 423/213.5 |
| 8,061,126 B2 * | 11/2011 | Gady et al. | 60/286 |
| 8,209,955 B2 * | 7/2012 | Adams et al. | 60/285 |
| 8,429,898 B2 * | 4/2013 | Darr et al. | 60/285 |
| 8,555,613 B2 | 10/2013 | Wang et al. | |
| 2010/0139380 A1 | 6/2010 | Lee et al. | |

* cited by examiner

*Primary Examiner* — Thomas Denion
*Assistant Examiner* — Diem Tran
(74) *Attorney, Agent, or Firm* — Quinn Law Group, PLLC

(57) ABSTRACT

A vehicle includes an engine, an exhaust system, a selective catalytic reduction (SCR) device, a first and a second NOx sensor configured to respectively measure an upstream and a downstream NOx level, and a controller or host machine. The controller, via the present method, calculates a NOx conversion efficiency rate of the SCR device using the NOx levels from the sensors. At the end of a key cycle when an accumulated amount of upstream NOx is less than a calibrated upstream NOx level, the controller determines if the NOx conversion efficiency rate is presently passing or failing. The accumulated upstream NOx is recorded in memory for use in calculating the NOx conversion efficiency rate during a subsequent key cycle only when the NOx conversion efficiency rate is presently passing at the end of the key cycle. A control system for the vehicle uses the controller and sensors as noted above.

14 Claims, 1 Drawing Sheet

METHOD AND SYSTEM FOR CONTROLLING A NITROGEN OXIDE (NOX) CONVERSION EFFICIENCY MONITOR

TECHNICAL FIELD

The present invention relates to a method and system for controlling a nitrogen oxide (NOx) conversion efficiency monitor of the type used in an engine exhaust system.

BACKGROUND

Spark-type and compression-type internal combustion engines can generate several forms of nitrogen oxide (NOx) gasses as natural byproducts of the fuel combustion process. NOx gasses may be present in an engine exhaust stream in various forms, including nitric oxide (NO), nitrogen dioxide ($NO_2$), and nitrous oxide ($N_2O$). To reduce the levels of the various NOx gasses present in vehicle tailpipe emissions, modern vehicles are equipped with various catalytic devices that reduce the NOx gasses to inert compounds.

Within a vehicle exhaust system, a suitable reductant such as ammonia or urea may be added at precisely controlled rates to the NOx-containing exhaust stream, and then passed over a catalytic device. Catalytic action subsequently converts the NOx gasses into nitrogen and water. Sensors positioned within the exhaust stream measure NOx levels to determine the conversion efficiency of any catalytic device used for this purpose. However, conventional NOx conversion efficiency monitoring algorithms may be less than optimally robust under certain operating and maintenance conditions.

SUMMARY

A vehicle is disclosed herein that includes an internal combustion engine. The vehicle includes one or more nitrogen oxide (NOx) sensors, a selective catalytic reduction (SCR) device, and a controller having an SCR efficiency monitor and an algorithm for controlling this monitor. The controller performs a calculation of SCR efficiency via the efficiency monitor using incomplete upstream NOx integration quantities at the end of every key/drive cycle, as explained herein. This is done to determine if SCR conversion efficiency is presently passing or presently failing at the end of a key cycle.

If presently failing, the controller does not store the accumulated integration quantities. Instead, the SCR efficiency calculations start anew at the beginning of the next key cycle. If at the end of the key cycle the efficiency results are passing, the accumulated integration quantities are recorded in memory, and the SCR efficiency calculation continues to add to the accumulated integration quantities upon commencing the next key cycle.

The present method may be beneficially used once a failing result has already been registered and communicated to a driver of the vehicle, e.g., via a dashboard indicator lamp, or alternatively once the vehicle is in the service environment prior to a failing result, i.e., a failing trend condition, although the method is not limited to these situations. If the vehicle is in a service environment, for example, the failing trend condition could be recognized using a calibrated service scan tool. Once a fail result has occurred and the driver has been alerted, the method could be used by a person attempting to repair the problem without a proper service scan tool. The present method therefore prevents storage of faulted integration results during a trip prior to such a person making the repair.

In particular, a vehicle includes an internal combustion engine, an exhaust system configured to condition an exhaust stream from the engine, an SCR device, first and second NOx sensors configured to respectively measure an upstream and a downstream NOx level, and a controller. The controller calculates a NOx conversion efficiency rate of the SCR device using the upstream NOx level and the downstream NOx level.

Additionally, the controller determines, at the end of a key cycle and when an accumulated amount of upstream NOx is less than a calibrated level, whether the NOx conversion efficiency rate is presently passing or presently failing. The controller records the accumulated amount of upstream NOx in memory for use in calculating the NOx conversion efficiency in a subsequent key cycle only when the NOx conversion efficiency rate is presently passing at the end of the key cycle.

A method for use aboard the above vehicle includes using the controller, e.g., a host machine thereof, to calculate a NOx conversion efficiency rate of the SCR device using NOx sensors. The method further includes selectively determining, at the end of a key cycle and when an accumulated amount of upstream NOx is less than a calibrated upstream NOx level, whether the NOx conversion efficiency rate is presently passing or presently failing. The accumulated amount of upstream NOx is recorded in memory for use in calculating the NOx conversion efficiency rate during a subsequent key cycle only when the NOx conversion efficiency rate is presently passing at the end of the key cycle.

The above features and advantages and other features and advantages of the present invention are readily apparent from the following detailed description of the best modes for carrying out the invention when taken in connection with the accompanying drawings.

DESCRIPTION

Figure 1:
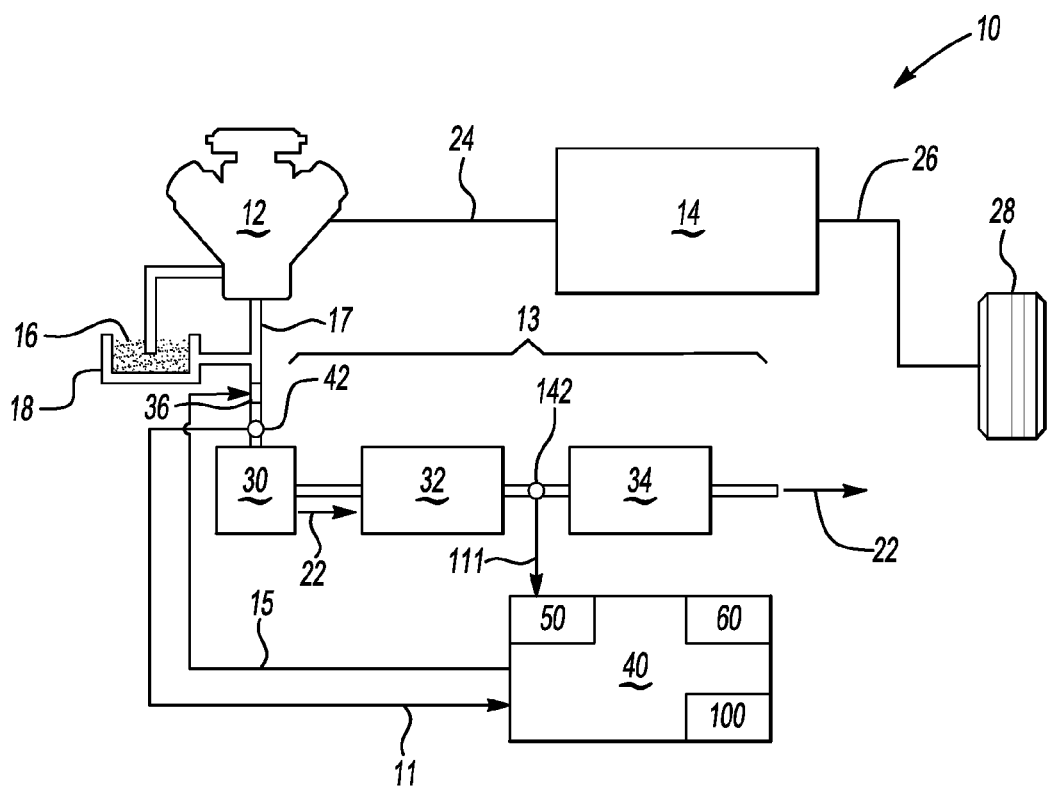
FIG. 1 is a schematic illustration of a vehicle having an exhaust system which includes a selective catalytic reduction (SCR) device for catalytically reducing levels of nitrogen oxide (NOx) gasses in an engine exhaust stream.

Referring to the drawings, wherein like reference numbers correspond to like or similar components throughout the several figures, a vehicle 10 is shown schematically in FIG. 1. The vehicle 10 includes an internal combustion engine 12. The engine 12 may be configured as a spark ignition-type gasoline engine, a compression-type diesel engine, or any other engine capable of generating an exhaust stream (arrow 22) as a byproduct of a fuel combustion process. The exhaust stream (arrow 22) is discharged from the cylinders of the engine 12, and thereafter passes through an exhaust system 13 before being discharged to the surrounding atmosphere.

Upon exiting the engine 12, the exhaust stream (arrow 22) may have relatively high levels of nitrogen oxide (NOx) gasses. Therefore, the exhaust system 13 may be configured with various devices that collectively reduce the levels or concentrations of these gasses. A selective catalytic reduction (SCR) device 32 is one such device included within the exhaust system 13, with the NOx-reducing structure and function of the SCR device described in detail below. The vehicle 10 may also include a controller 40, an SCR efficiency monitor 50, and an algorithm 100, an example of which is shown in FIG.

2. The algorithm 100 is selectively executed after a NOx reduction efficiency-related diagnosis is performed by the SCR efficiency monitor 50. Execution of the algorithm 100 occurs at the end of a key cycle. A key cycle or drive cycle refers to a period of time between turning the engine 12 and controller 40 on and off again, e.g., a vehicle trip.

The SCR device 32 catalytically converts NOx gasses into water ($H_2O$) and nitrogen (N) as inert compounds. The SCR device 32 may be configured as a ceramic brick or honeycomb structure, a plate, or any other suitable catalytic design. In one embodiment, an upstream NOx sensor 42 is positioned upstream with respect to the SCR device 32, such as at or near outlet port(s) 17 of the engine 12. In the same embodiment, a downstream NOx sensor 142 is positioned downstream with respect to the SCR device 32, such as just upstream of a particulate filter 34. Measured NOx levels (arrows 11, 111) from the respective upstream and downstream NOx sensors 42, 142 are communicated to the controller 40 as shown.

Still referring to FIG. 1, the algorithm 100 may be selectively executed by associated hardware components of the controller 40 to automatically evaluate or diagnose, at the end of the key cycle, whether the SCR efficiency monitor 50 is presently on a passing or a failing path. The controller 40 then executes a control action with respect to the SCR efficiency monitor 50 in one manner when the path is presently passing, and in another manner when the path is presently failing.

The SCR efficiency monitor 50 calculates the NOx conversion efficiency of the SCR device 32 by integrating an amount of upstream and downstream NOx, and by subsequently performing a NOx reduction efficiency calculation. The term "integrate" when used in conjunction with the SCR device 32 and the SCR efficiency monitor 50 refers to the accumulation over time of a mass measurement of NOx. To integrate, the SCR efficiency monitor 50 accumulates an upstream mass using the upstream NOx level (arrow 11) from the upstream NOx sensor 42 and a downstream mass using the downstream NOx level (arrow 111) from the downstream NOx sensor 142. The accumulation is over a calibrated window or duration, and thus by selecting the duration the controller 40 can also vary the calibrated mass used in any efficiency calculations.

For example, a detected upstream NOx rate of 1 g/min may be integrated or accumulated over a calibrated window of 10 minutes to generate 10 grams of NOx during that window. The NOx reduction efficiency of the SCR device 32 can be expressed as a percentage. Hence, a 90% NOx reduction efficiency that sees X grams of upstream NOx at NOx sensor 42 over a calibrated window would have 0.1X grams of downstream NOx.

If the efficiency results at the end of a given key cycle are failing, the accumulated integration quantities are not stored by the controller 40. Instead, the SCR efficiency calculation performed by the SCR efficiency monitor 50 begins anew at the next key cycle. If the efficiency results at the end of a given key cycle are passing, the integration quantities are stored in memory 60, and the SCR efficiency monitor 50 continues to add to these accumulated values upon commencement of the next key cycle.

The present method 100 may be selectively executed by the controller 40 when an SCR NOx efficiency code is set. Currently, if a code has been set for a low SCR efficiency, and if the vehicle undergoes repair service to correct a perceived error underlying the code, the next diagnostic by the SCR efficiency monitor 50 could still yield a failing result due to the storage of NOx values accumulated prior to the repair. This storage typically occurs at the end of every key cycle, and is needed for rate-based regulatory requirements. However, customer confusion may result when the code is not properly reset.

Still referring to FIG. 1, depending on the embodiment, the exhaust system 13 may also include an oxidation catalyst 30 and the particulate filter 34 noted above. The particulate filter 34 may be configured as ceramic foam, metal mesh, pelletized alumina, or any other temperature and application-suitable material(s). A fuel injection device 36 is in electronic communication with the controller 40 or other control device, and controlled via a set of control signals (arrow 15). The fuel injection device 36 is in fluid communication with a tank 18 of fuel 16. The fuel injection device 36 selectively injects some of the fuel 16 into the oxidation catalyst 30. The injected fuel 16 may be burned in a controlled manner within the oxidation catalyst 30 in order to generate heat at levels that are sufficient for regenerating the particulate filter 34.

Energy released by the combustion of fuel 16 by the engine 12 produces torque on a rotatable input member 24 of a transmission 14. Torque from the engine 12 is transferred through the various gear sets, clutches, brakes, and interconnecting members (not shown) of the transmission 14 to a rotatable output member 26 of the transmission. Output torque from the transmission 14 is thus delivered to a set of drive wheels 28, only one of which is shown in FIG. 1 for simplicity.

The controller 40, including the SCR efficiency monitor 50 as required, may be configured as a host machine, e.g., a digital computer or microcomputer, acting as a vehicle control module, and/or as a proportional-integral-derivative (PID) controller device having a microprocessor or central processing unit (CPU), read-only memory (ROM), random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. The algorithm 100 and any required reference calibrations are stored within or readily accessed by the controller 40 to provide the functions described below.

Figure 2:
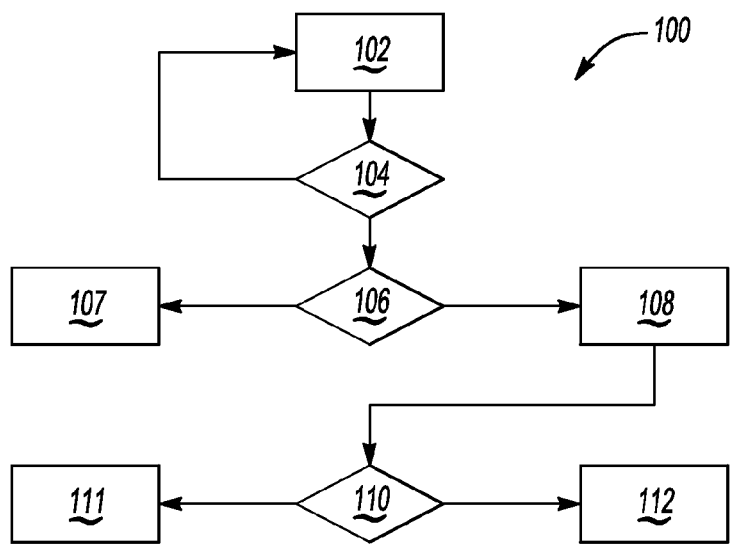
FIG. 2 is a flow chart describing a method for controlling an operation of the SCR efficiency monitor of the vehicle shown in FIG. 1.

Referring to FIG. 2 in conjunction with the structure of the vehicle 10 shown in FIG. 1, the present algorithm 100 begins with step 102, wherein the controller 40 detects the amounts of upstream and downstream NOx using the NOx sensors 42 and 142, respectively. The controller 40 then integrates or accumulates the NOx levels upstream and downstream of the SCR device 32 as explained above. The SCR efficiency monitor 50 may be used for this purpose. The algorithm 100 then proceeds to step 104.

At step 104, the controller 40 determines whether an end of a key cycle has been reached. Step 102 is repeated if the key cycle has not yet ended. The algorithm 100 proceeds to step 106 if the key cycle has ended.

At step 106, the controller 40 determines whether a calibrated amount of upstream NOx has been accumulated. This calibrated amount may be selected by the controller 40 by varying the calibrated integration window or sample duration. For example, in one embodiment a threshold of approximately 6 g of NOx may be used. The algorithm 100 proceeds to step 107 if the calibrated amount of NOx has accumulated. Otherwise, the algorithm 100 proceeds to step 108.

At step 107, the controller 40 uses the SCR efficiency monitor 50 to calculate the NOx conversion efficiency of the SCR device 32, and to generate any passing or failing diagnostic codes as needed. In one embodiment, the efficiency calculation performed by the SCR efficiency monitor 50 may be performed continuously, with the final calculation used for calibration or analysis purposes. Thereafter, the accumulated NOx values recorded in memory 60 are re-zeroed, and the algorithm 100 commences anew at step 102 upon initiation of the next key cycle.

At step 108, the controller 40 stores the incomplete integration quantities in memory 60, and then proceeds to step 110.

At step 110, the controller 40 determines whether the SCR efficiency monitor 50 is presently on a path toward a passing result or a failing result. If the results indicate progression toward a failing result, the algorithm 100 proceeds to step 111. If however the results indicate progression toward a passing result, the algorithm 100 proceeds instead to step 112.

At step 111, the controller 40 does not store the present integration quantities or accumulated upstream NOx values. Rather, the algorithm 100 starts anew at step 102 with initiation of the next key cycle, and with a zeroed memory 60.

At step 112, the controller 40 stores the integration quantities in memory 60. The algorithm 100 starts anew at step 102 with the next key cycle and the memory 60 still holding the previously-recorded integration quantities or accumulated upstream NOx values.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
an internal combustion engine;
an exhaust system configured to condition an exhaust stream from the engine;
a selective catalytic reduction (SCR) device that catalytically converts nitrogen oxide (NOx) gasses in the exhaust stream into water and nitrogen;
a first NOx sensor configured to measure an upstream NOx level, wherein the upstream NOx level is a level of the NOx gasses upstream of the SCR device;
a second NOx sensor configured to measure a downstream NOx level, wherein the downstream NOx level is a level of the NOx gasses downstream of the SCR device; and
a controller configured to calculate a NOx conversion efficiency rate of the SCR device using the upstream NOx level and the downstream NOx level;
wherein the controller is configured to determine, at the end of a key cycle and when an accumulated amount of upstream NOx is less than a calibrated upstream NOx level, whether the NOx conversion efficiency rate is presently passing or presently failing, and to record the accumulated amount of upstream NOx in memory, for use in calculating the NOx conversion efficiency rate during a subsequent key cycle, only when the NOx conversion efficiency rate is presently passing at the end of the key cycle.

2. The vehicle of claim 1, wherein the controller is configured to select the calibrated upstream NOx level by varying the duration of a calibration window.

3. The vehicle of claim 1, wherein the controller zeroes the accumulated amount of upstream NOx recorded in memory when the NOx conversion efficiency rate is presently failing at the end of the key cycle.

4. The vehicle of claim 1, wherein the controller is configured to store the accumulated amount of upstream NOx in memory only when the SCR NOx efficiency code has not been set.

5. The vehicle of claim 1, further comprising a particulate filter downstream of the SCR device, wherein the downstream NOx sensor is positioned between the SCR device and the particulate filter.

6. The vehicle of claim 5, further comprising an oxidation catalyst upstream of the SCR device, wherein the particulate filter is selectively regenerable using heat generated within the oxidation catalyst.

7. A method for use aboard a vehicle having an internal combustion engine, an exhaust system, a selective catalytic reduction (SCR) device that catalytically converts nitrogen oxide (NOx) gasses in an exhaust stream from the engine into water and nitrogen, and a controller, the method comprising:
using the controller to calculate a NOx conversion efficiency rate of the SCR device using an upstream NOx level from a first NOx sensor positioned upstream of the SCR device and a downstream NOx level from a second NOx sensor positioned downstream of the SCR device;
selectively determining, at the end of a key cycle and when an accumulated amount of upstream NOx is less than a calibrated upstream NOx level, whether the NOx conversion efficiency rate is presently passing or presently failing; and
recording the accumulated amount of upstream NOx in memory for use in calculating the NOx conversion efficiency rate during a subsequent key cycle only when the NOx conversion efficiency rate is presently passing at the end of the key cycle.

8. The method of claim 7, further comprising:
selecting the calibrated upstream NOx level by automatically varying the duration of a calibration window.

9. The method of claim 7, further comprising zeroing the accumulated amount of upstream NOx when the NOx conversion efficiency rate is presently failing at the end of the key cycle.

10. The method of claim 7, further comprising storing the accumulated amount of upstream NOx in memory only when an SCR NOx efficiency code has not been set.

11. A control system for a vehicle having a selective catalytic reduction (SCR) device that catalytically converts nitrogen oxide (NOx) gasses in an engine exhaust stream into water and nitrogen, the control system comprising:
an upstream NOx sensor positioned in proximity to an exhaust port of the engine, and configured to measure an upstream NOx level;
a downstream NOx sensor positioned in proximity to an outlet side of the SCR device, and configured to measure a downstream NOx level; and
a controller configured to calculate a NOx conversion efficiency rate of the SCR device as a function of the upstream NOx level and the downstream NOx level;
wherein the controller is configured to detect the end of a key cycle and when an accumulated amount of upstream NOx is less than a calibrated upstream NOx level as an enabling condition, and, in response to the enabling condition:
determines whether the NOx conversion efficiency rate is presently passing or failing relative to a calibrated threshold efficiency; and
records the accumulated amount of upstream NOx in memory for use in calculating the NOx conversion efficiency rate during a subsequent key cycle only when the NOx conversion efficiency rate is presently passing at the end of the key cycle.

12. The control system of claim 11, wherein the controller is configured to select the calibrated upstream NOx level by varying the duration of a calibration window.

13. The control system of claim 11, wherein the controller zeroes the accumulated amount of upstream NOx in memory when the NOx conversion efficiency rate is presently failing at the end of the key cycle.

14. The control system of claim 11, wherein the controller is configured to store the accumulated amount of upstream NOx in memory only when the SCR NOx efficiency code has not been set.

* * * * *